United States Patent [19]

Koether

[11] 4,320,285
[45] Mar. 16, 1982

[54] PRIMARY THERMOSTAT USING COOKING COMPUTER TEMPERATURE PROBE WITH CONTROL TRANSFER UPON PROBE FAILURE

[76] Inventor: Bernard G. Koether, 4 Nutmeg La., Westport, Conn. 06880

[21] Appl. No.: 37,849

[22] Filed: May 10, 1979

[51] Int. Cl.³ .............................................. H05B 1/02
[52] U.S. Cl. ................................... 219/497; 219/441; 219/508; 219/509; 219/494; 361/106; 324/243; 99/329 R; 73/362 R
[58] Field of Search ............... 219/514, 519, 510, 489, 219/494, 497, 508, 509, 451, 452, 441, 435; 307/117, 130; 361/103, 106; 324/243; 73/362 R; 99/333, 329 R

[56] References Cited

U.S. PATENT DOCUMENTS

| | | | |
|---|---|---|---|
| 3,360,693 | 12/1967 | Fickweiler | 219/505 X |
| 3,842,243 | 10/1974 | Gregory | 219/501 |
| 3,883,753 | 5/1975 | Harrison et al. | 307/117 |
| 3,950,632 | 4/1976 | Rivelli | 219/441 |
| 3,979,056 | 9/1976 | Barnes | 219/489 |
| 3,982,098 | 9/1976 | Trostler | 219/501 |
| 4,091,266 | 5/1978 | Ito et al. | 219/501 |
| 4,109,134 | 8/1978 | Van Herten | 219/501 |

Primary Examiner—B. A. Reynolds
Assistant Examiner—M. Paschall
Attorney, Agent, or Firm—Cifelli, Frederick & Tully

[57] ABSTRACT

A primary thermostat is provided in a fryer of the type comprising a frypot containing cooking oil, a heater, heat control switching means for operating the heater and a thermostat including a temperature probe, the fryer thermostat being used as a backup to the primary thermostat. The primary thermostat utilizes the signal of a temperature probe associated with a cooking computer which calculates the cooking time period for food items cooked in the fryer. The primary thermostat includes comparators monitoring for open or shorted conditions of the cooking computer temperature probe, and a control transfer relay which switches thermostatic control of the fryer from the primary to the backup fryer thermostat in the event of probe failure. The primary thermostat also includes a temperature selection switch for selecting a desired temperature of the cooking oil and temperature control circuitry for operating the fryer heater to maintain the desired temperature.

8 Claims, 2 Drawing Figures

PRIMARY THERMOSTAT USING COOKING COMPUTER TEMPERATURE PROBE WITH CONTROL TRANSFER UPON PROBE FAILURE

BACKGROUND OF THE INVENTION

This invention relates to a primary thermostat for a fryer which is combined with a cooking computer for a fryer by sharing the output of the cooking computer temperature probe, wherein the operation of the cooking computer temperature probe is monitored and upon failure thereof thermostatic control of the fryer is transferred to a backup thermostat extant in the fryer.

Cooking of foods, such as potatoes, fish, chicken, etc., by frying them in hot cooking oil has been popular in restaurants for a long period of time. Restaurants carrying these items on their menus cook them in fryers, the fryers generally comprising a frypot to hold the cooking oil, heating means to heat the oil, and a thermostat to control the operation of the heating means. The heating means for the fryer is usually one of two types, namely either a gas burner mounted under the frypot or one or more electric resistance heating elements immersed in the cooking oil. The thermostat provides for setting a desired temperature and includes means to measure the actual temperature of the cooking oil, and functions to operate the heating means when the cooking oil falls below the desired temperature. Typically, a relay is provided which either turns on a supply valve to the gas burner or current to the electric resistance heating elements under the control of the thermostat.

Originally, the food items were placed in the hot cooking oil, and the thermostat functioned to maintain the cooking oil as close as possible to the desired cooking temperature while cooking proceeded. The time period for which the food items were cooked was determined by the operator on the basis of his observation and judgment. Cooking computers have been developed and are now widely used in conjunction with fryers to achieve more accurate control of the cooking of food items. In general, cooking computers function to cook food items over a time period calculated to achieve the desired degree of doneness, and this is accomplished by adjusting the cooking time period for variations in the temperature of the cooking oil. Therefore, the cooking computers include a temperature probe for continually measuring the temperature of the cooking oil, and the temperature probes used in conjunction with the cooking computers tend to be of high accuracy and quick response so that the computing of the cooking time period is also accurate. Martino et al U.S. Pat. No. 3,326,692 shows an early example of a cooking computer and Barnes U.S. Pat. No. 3,979,056 shows a more recent example of a cooking computer. Thus, a typical restaurant fryer includes a thermostat having its own temperature probe, the thermostat operating to maintain the cooking oil at a desired set temperature, and also has a cooking computer and an associated cooking computer food temperature probe for calculating the cooking time period of food items.

There are certain problems associated with the present installations. In particular, the thermostats of the fryers often do not maintain close control of the temperature of the cooking oil, and fluctuations from the desired temperature are larger than desired. This is partially because temperature probes associated with the fryer thermostats are often of slow response. For example, if a large load of a cold food item is placed in the cooking oil, the temperature of the cooking oil drops rapidly and the fryer temperature probe and thermostat are slow to recognize the drop and turn on the heating means. Also if the fryer temperature probe or thermostat fails, the fryer ceases to operate and the flow of cooked food items to customers is interrupted. A particularly dangerous problem occurs if the thermostat fails with the heating means in its on condition, wherein the temperature of the cooking oil can rise rapidly with the attendant risk of fire.

SUMMARY OF THE INVENTION

It is a principal object of the invention herein to provide increased safety and reliability in the thermostatic control of fryers.

It is another object of the invention herein to provide a primary thermostat for a fryer wherein the primary thermostat utilizes a temperature probe and provides automatic transfer of control from the primary thermostat to the extant thermostat of the fryer if the temperature probe of the primary thermostat fails.

It is an additional object of the invention herein to provide a primary thermostat for a fryer utilizing the temperature probe of a cooking computer associated with the fryer.

It is a further object of the invention herein to provide primary and backup thermostats for a fryer with means for manually selecting the desired thermostat system.

According to the invention herein, a fryer having a thermostat including a temperature probe is provided with an additional primary thermostat utilizing an additional temperature probe, the primary thermostat including means for automatically transferring thermostatic control of the fryer to the extant fryer thermostat as a backup in the event of temperature probe failure in the primary thermostat. In the preferred embodiment, the primary thermostat utilizes the temperature probe of a cooking computer associated with the fryer for calculating the cooking time period of food items therein.

The fryer generally comprises a frypot containing cooking oil and heating means for heating the cooking oil, wherein the heating means may be either a gas burner or one or more electric resistance heating elements immersed in the cooking oil. The fryer further comprises thermostat means including means to select a desired temperature of the cooking oil, a temperature probe to sense the actual temperature of the cooking oil and a heat control relay or similar switch operated by the thermostat to turn on the heating means when the actual temperature is below the desired temperature.

The primary thermostat comprises a control transfer relay or other switching means functioning in the manner of a relay connected to select whether the primary or backup thermostat operates the heat control relay. The control transfer relay is biased to select the backup thermostat of the fryer and the relay coil is normally energized through a gate to select the primary thermostat. The primary thermostat further comprises means for monitoring the operation of the cooking computer temperature probe. Upon determining that the cooking computer temperature probe is not functioning by virtue of either being open or shorted, the gate energizing the coil of the control transfer relay is opened, whereby the control transfer operates to switch thermostatic control of the fryer from the primary to the backup fryer thermostat. A manually operable switch is connected in series with the gate, so that control can be switched from the primary to the backup thermostat by opening the manual switch.

The primary thermostat further comprises a temperature selection switch which provides a signal corresponding to the desired temperature of the cooking oil, and temperature control circuitry which receives the signal corresponding to the desired temperature and also receives the signal from the cooking computer temperature probe corresponding to the actual temperature of the cooking oil, the temperature control circuitry providing a signal for operating the heat control relay to turn on the fryer heating means when the actual temperature of the cooking oil falls below the desired temperature of the cooking oil.

Thus, when the primary thermostat is selected by the manual switch and the cooking computer temperature probe is operating, i.e. not shorted or open, the primary thermostat controls operation of the heating means of the fryer to maintain a desired selected temperature of the cooking oil. If the cooking computer temperature probe fails, thermostatic control of the fryer is automatically switched to the backup fryer thermostat. The backup fryer thermostat can also be selected by the manual switch, if desired. Thus, fryer operation is not disrupted by failure of the cooking computer temperature probe, and food preparation can continue. Also, the dangerous condition of probe failure which places the fryer in runaway operation, possibly leading to a fire, is avoided.

Other objects and features of the invention herein will in part be obvious and will in part appear from a perusal of the following description of the preferred embodiment and the claims, taken together with the drawings.

DRAWINGS

FIG. 1 is a schematic view of a fryer with a block diagram of a primary thermostat for the fryer according to the invention herein; and FIG. 2 is a schematic circuit diagram of the elements of the primary thermostat shown in block form in FIG. 1.

The same reference numerals refer to the same elements in both Figures.

DESCRIPTION OF PREFERRED EMBODIMENT

Figure 1:
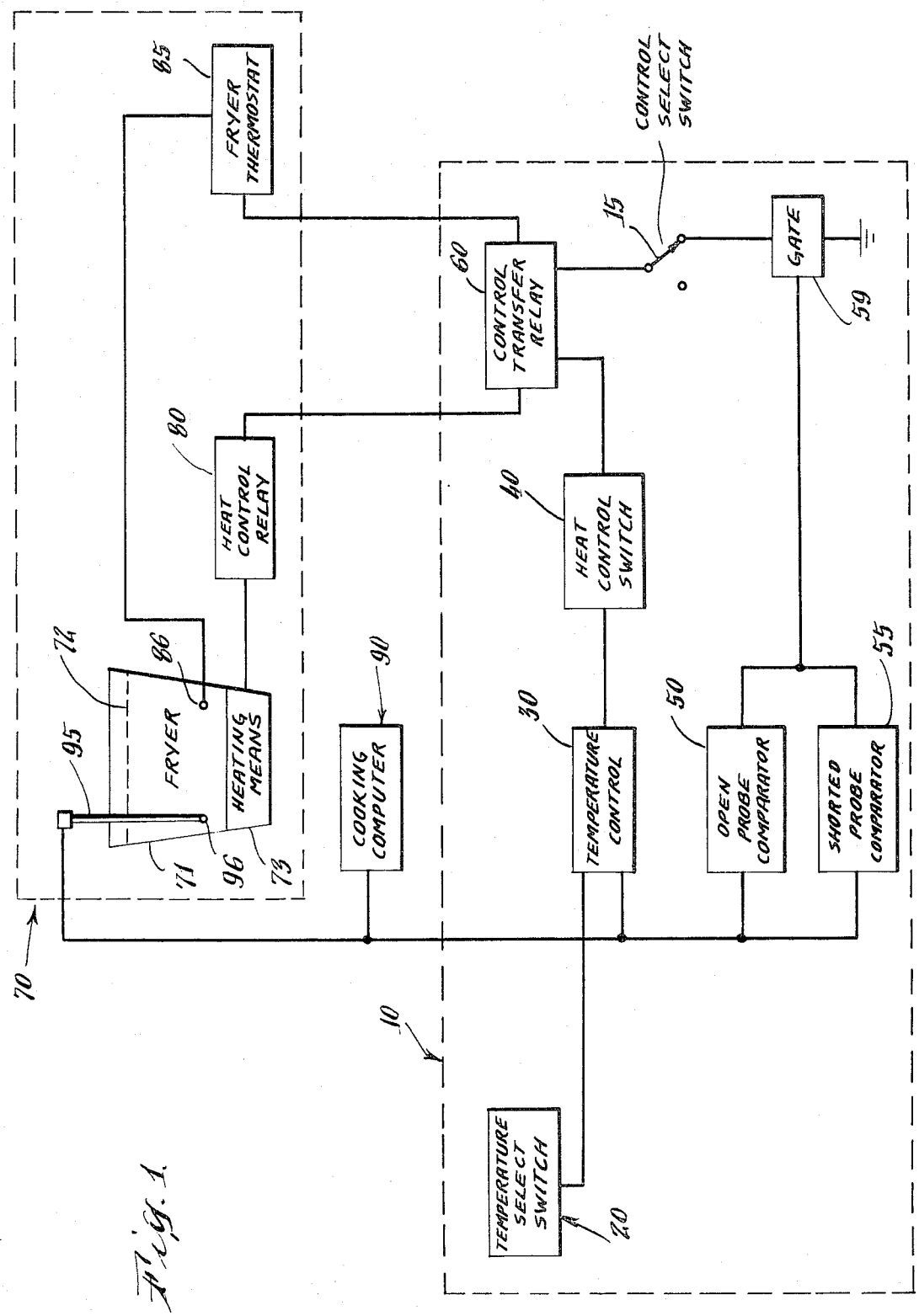

With reference to FIG. 1, there is shown, schematically, a fryer 70, a cooking computer 90 including a cooking computer temperature probe 95, and a primary thermostat 10 for the fryer 70, according to the invention herein.

The fryer 70 generally comprises a frypot 71 which contains cooking oil 72. The fryer 70 also comprises heating means 73 and a heat control relay 80 which operates the heating means 73. The fryer 70 further comprises a fryer thermostat 85, hereinafter often referred to as the "backup" thermostat. It includes means (not shown) for selecting a desired temperature of the cooking oil and a temperature probe 86 positioned in the frypot 71 to provide an indication of the actual temperature of the cooking oil. Prior to the addition of the primary thermostat 10, the fryer thermostat 85 would cause the heat control relay 80 to operate to turn on the heating means 73 when the actual temperature of the cooking oil fell below the desired temperature thereof. However, according to the invention herein, the fryer thermostat 85 is used as a backup thermostat which is switched into operation on failure of the cooking computer temperature probe 95 utilized by the primary thermostat 10.

The cooking computer 90 is used in conjunction with the fryer 70 to calculate the cooking time period for food items being cooked in the fryer 70, the cooking computer 90 calculating a cooking time period which achieves the desired degree of doneness of the food item taking into account variations in the temperature of the cooking oil 72. For instance, when the food item is placed in the cooking oil, the food item is cold and tends to lower the temperature of the cooking oil 72. Although the thermostat senses the lower temperature of the cooking oil and turns on the heating means 73 to bring the temperature of the cooking oil back to the desired temperature, there is nevertheless a period of time before the cooking oil recovers to the desired temperature. The cooking computer determines the proper cooking time period in light of such temperature variations. A suitable cooking computer for this purpose is described in Barnes U.S. Pat. No. 3,979,056, the disclosure of which is incorporated herein by reference.

The cooking computer 90 has associated therewith a temperature probe 95 which generally comprises a thermistor 96 or other temperature sensing element located at the tip thereof. The temperature probe 95 is mounted such that the thermistor 96 is positioned in the cooking oil to produce an electrical signal corresponding to, i.e. functionally related to, the temperature of the cooking oil. The output of the temperature probe 95 goes to the cooking computer 90 for use in calculating the cooking time period to achieve the desired degree of doneness of the food item.

The primary thermostat 10 also receives the output of the cooking computer temperature probe 95. The primary thermostat 10 generally comprises a temperature select switch 20, temperature control circuitry 30, a heat control switch 40, an open probe comparator 50, a shorted probe comparator 55, a gate 59 and a control transfer relay 60. A manually operated control select switch 15 is used to select the primary thermostat 10 over the backup thermostat 85, and the control transfer relay 60 maintains the control of the fryer in the primary thermostat 10 as long as the cooking computer temperature probe 95 is operative. The output of the cooking computer probe 95 is provided to the temperature control circuitry 30, the open probe comparator 50 and the shorted probe comparator 55. If the cooking computer temperature probe becomes open or shorted, as determined by the open probe comparator 50 and the shorted probe comparator 55, respectively, gate 59 is opened and the control transfer relay 60 places thermostatic control of the fryer 70 in the backup fryer thermostat 85.

A desired temperature for the cooking oil is selected via the temperature select switch 20, which provides a second input corresponding to the selected temperature to the temperature control 30. When the actual temperature of the cooking oil falls below the selected desired temperature thereof, the temperature control 30 operates the heat control switch 40 to turn on the heating means 73 of the fryer 70 via the control transfer relay 60 and the heat control relay 80, as explained more fully below.

Figure 2:
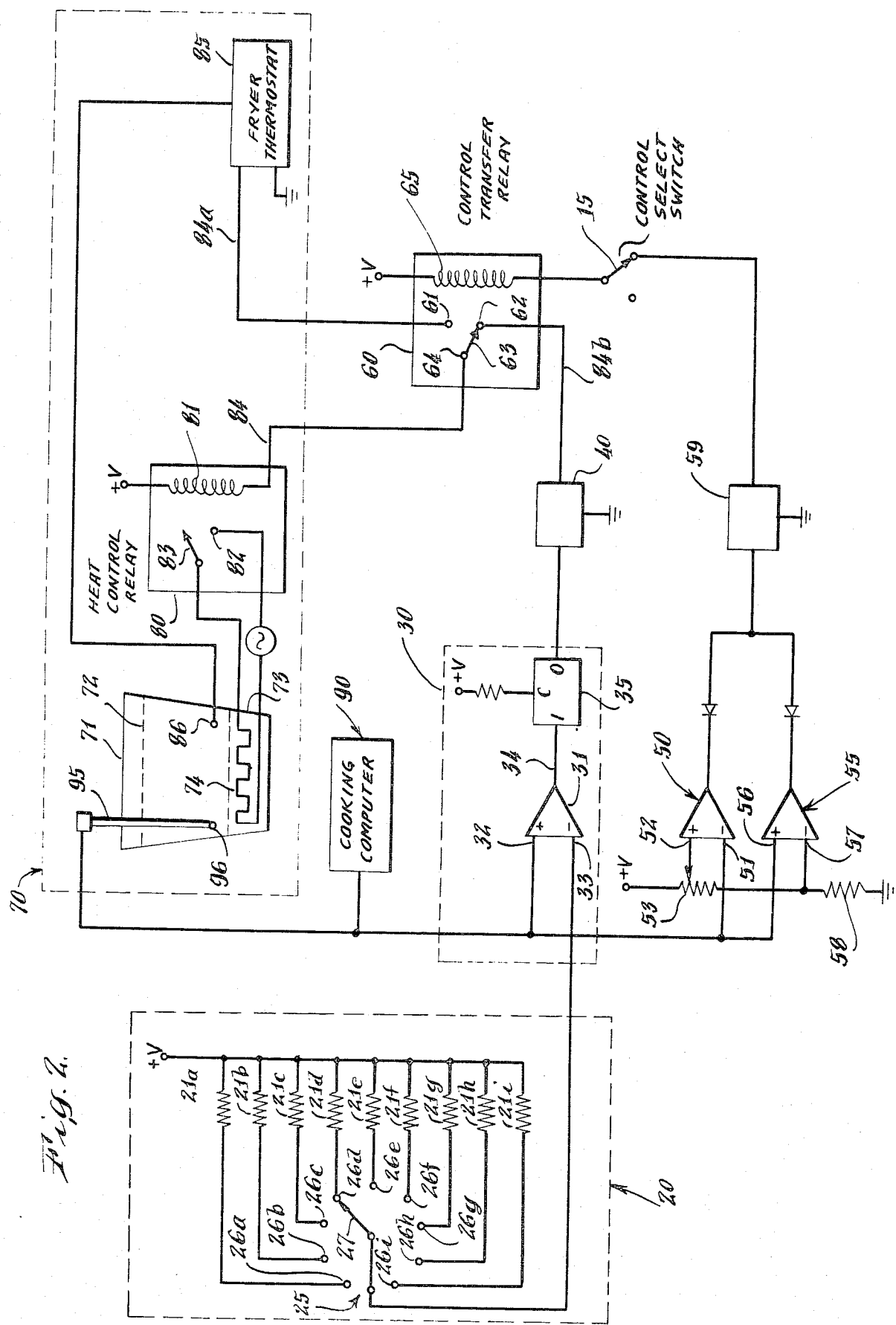

With reference to FIG. 2, the circuitry of the primary thermostat 10 and portions of the fryer 70 is shown. In the embodiment shown, the heating means 73 of the fryer 70 is an electrical resistance heating element 74 immersed in the cooking oil 72. The heat control relay 80 has contacts 82 and 83 which are closed upon energization of relay coil 81 to supply power to heating element 74. The coil 81 is energized by grounding line 84. Prior to the addition of the primary thermostat 10 according to the invention herein, lines 84 and 84a were connected, and the fryer thermostat 85 grounded line 84 when the actual temperature of the cooking oil falls below the desired temperature thereof, thus operating the heating element 74.

The control transfer relay 60 has stationary contacts 61 and 62 and a movable contact 63 which is biased to connect terminal 64 with the stationary contact 61. The movable contact 63 connects the terminal 64 with the other stationary contact 62 when the coil 65 of the control transfer relay 60 is energized. The terminal 64 is connected via line 84 with the coil 81 of the heat control relay 80, contact 61 is connected via line 84a to the backup fryer thermostat 85 and contact 62 is connected via line 84b to the heat control switch 40 of the primary thermostat 10. Thus, when the movable contact 63 closes against stationary contact 62, as shown in FIG. 1, the heat control switch 40 of the primary thermostat 10 controls the energization of coil 81 of the heat control relay 80. When the heat control switch 45 is on, coil 81 is energized to close the movable contact 82 with the stationary contact 83, thus supplying power to the heating element 74 of the fryer 71. When the movable contact 63 of the control transfer relay 60 closes against stationary contact 61, the energization of coil 81 and therefore also the operation of the heating element 74 is under control of the backup fryer thermostat 85.

Coil 65 of the control transfer relay 60 is energized to place the heating element of the fryer under the control of the primary thermostat 10 when the control select switch 15 is closed and when gate 59 is conductive. Gate 59 is conductive for as long as the cooking computer temperature probe 95 associated with the cooking computer 90 is operative. In particular, the signal from the cooking computer temperature probe 95 is applied to input 51 of open probe comparator 50. A signal taken off resistor 53 of a voltage divider is applied to the second input 52 of the open probe comparator, the signal corresponding to an open probe condition. If the cooking computer temperature probe 95 is open, the comparator 50 provides a signal opening gate 59. Similarly, the signal from the cooking computer temperature probe 95 is also received at the input 56 of shorted probe comparator 55. The second input 57 to the shorted probe comparator 55 is a low voltage take off from the voltage divider comprising resistors 53 and 58. If the cooking computer temperature probe 95 is shorted, the comparator 55 provides a signal opening gate 59.

Thus, if either an open probe or shorted probe condition exists, gate 59 is opened. This de-energizes the coil 65 of the control transfer relay 60, wherein the movable contact 63 is biased against the stationary contact 61 to place control of the heating element 74 of the fryer 70 with the backup fryer thermostat 85.

When the cooking computer temperature probe 95 is operative, the fryer heating element 74 is under control of the primary thermostat 10 and in particular, the temperature control circuitry 30 thereof. The temperature control circuitry comprises a comparator 31 which receives as a first input 32 the signal from the temperature probe 95 corresponding to the actual temperature of the cooking oil. The second input 33 to the comparator 31 is provided from the temperature select switch 20 and corresponds to the desired temperature of the cooking oil. The temperature select switch 20 comprises a plurality of resistors 21a-21i all connected on one side to a voltage source terminal 22 and each connected on its other side to terminals 26a-26i of a mechanical switch 25. Movable switch member 27 connects a selected one of the resistors 21a-21i to the input 33 of comparator 31. Each of the resistors 21a-21i corresponds to a different desired temperature of the cooking oil, the value of the resistor being selected to provide a signal equal to the temperature probe signal at the desired temperature.

When the actual temperature of the cooking oil falls below the desired temperature of the cooking oil, the comparator 31 of the temperature control circuitry 30 produces a signal on line 34 which operates flip flop 35. Flip flop 35 operates heat control switch 40 to energize the coil 81 of the heat control relay 80. This closes contacts 82 and 83 to supply power to the heating element 74 of the fryer. When the comparator 31 determines that the temperature of the cooking oil is at or exceeds the selected desired temperature, flip flop 35 changes state to open the heat control switch 40, thereby de-energizing the coil 81 of the heat control relay 80 and cutting off power to the heating element 74 of the fryer.

Accordingly, the primary thermostat 10 used in connection with fryer 70 and the cooking computer temperature probe 95 admirably achieves the objects of the invention herein. Specific advantageous features of the invention include the utilization of the cooking computer temperature probe, which in general has a faster response than the temperature probe of the fryer thermostat. Also, both safety and convenience are enhanced by the provision of a primary thermostat with automatic switch over to the extant fryer thermostat as a backup. It will be appreciated that changes made be made in the preferred embodiment described above without departing from the spirit and scope of the invention, e.g. other switch means can be substituted for relays, the invention being limited only by the following claims.

I claim:

1. An improvement in a fryer of the type comprising a frypot for holding cooking oil, heating means for heating the cooking oil in the frypot, heat control switching means for operating the heating means, the heat control switching means operated by a fryer thermostat including a temperature probe for sensing the actual temperature of the cooking oil and means for selecting a desired temperature of the cooking oil, the heating means being operated by a signal from the fryer thermostat when the actual temperature of the cooking oil falls below the desired temperature thereof, the fryer also being provided with a cooking computer and an associated cooking computer temperature probe for calculating a cooking period for food items cooked in the cooking oil, the improvement comprising a primary thermostat including:

(A) open probe monitoring circuitry for producing a signal in response to an open probe condition of the cooking computer temperature probe;

(B) shorted probe monitoring circuitry for producing a signal in response to a shorted probe condition of the cooking computer temperature probe;

(C) control transfer switching means placing control of the heat control switching means in the primary thermostat when the cooking computer temperature probe is not open and not shorted and automatically switching control of the heat control switching means to the fryer thermostat if the cooking computer temperature probe becomes open or shorted;

(D) temperature select means for producing a signal corresponding to a selected desired temperature of the cooking oil; and (E) temperature control circuitry for comparing the signal of the cooking computer temperature probe corresponding to the actual temperature of the cooking oil with the signal produced by the temperature select means corresponding to the desired temperature of the cooking oil, the temperature control circuitry producing a signal operating the heat control switch means when the actual temperature of the cooking oil is below the desired temperature of the cooking oil and control of the heat control switching means is in the primary thermostat.

2. The improvement in a fryer as defined in claim 1 wherein the primary thermostat further includes:

(F) a manually operated control select switch which selectively operates the control transfer switching means to place control of the heat control switching means in the fryer thermostat.

3. The improvement in a fryer as defined in claim 1 wherein the control transfer switching means comprises (1) a control transfer relay including a coil which when energized closes contacts to pass the signal from the temperature control circuitry of the primary thermostat to the heat control switching means of the fryer and when de-energized closes contacts to pass the signal from the fryer thermostat to the heat control switching means of the fryer, and (2) a gate energizing the control transfer relay coil when the open probe monitoring circuitry and the shorted probe monitoring circuitry are not producing a signal indicating an open probe or shorted probe condition.

4. The improvement in a fryer as defined in claim 3 and further comprising:

(F) a manually operated control select switch which selectively de-energizes the control transfer relay coil to place control of the heat control switching means in the fryer thermostat.

5. The improvement in a fryer as defined in claim 3 wherein the open probe monitoring circuitry comprises a first comparator and means providing a signal corresponding to an open probe condition to one input of the first comparator, the other input to the first comparator being the signal from the cooking computer temperature probe whereby the first comparator produces a signal upon an open probe condition of the cooking computer temperature probe, and the shorted probe monitoring circuitry comprises a second comparator and means providing a signal corresponding to a shorted probe condition to one input of the second comparator, the other input to the second comparator being the signal from the cooking computer temperature probe whereby the second comparator produces a signal upon a shorted probe condition of the cooking computer temperature probe.

6. The improvement in a fryer as defined in claim 5 wherein the temperature control circuitry comprises a third comparator the first input to which is the signal from the temperature select means corresponding to the selected desired temperature of the cooking oil and the second input to which is the signal from the cooking computer temperature probe corresponding to the actual temperature of the cooking oil, the third comparator producing a signal for operating the heat control switching means when the actual temperature of the cooking oil falls below the selected desired temperature of the cooking oil.

7. The improvement in a fryer as defined in claim 6 wherein the temperature select means comprises a plurality of resistors each connected at one end to a voltage source and manually operable switch means for selectively individually connecting the other end of each resistor to the first input of the third comparator, each resistor producing a signal corresponding to a selected desired temperature of the cooking oil.

8. An improvement in a fryer of the type comprising a frypot containing cooking oil, heating means for heating the cooking oil in the frypot, heat control switching means for operating the heating means, the heat control switching means operated by a fryer thermostat including a first temperature probe for sensing the actual temperature of the cooking oil and means for selecting a desired temperature of the cooking oil, the heating means being operated by a signal from the fryer thermostat when the actual temperature of the cooking oil falls below the desired temperature thereof, the improvement comprising a primary thermostat including:

(A) a second temperature probe for sensing the actual temperature of the cooking oil;

(B) open probe monitoring circuitry for producing a signal in response to an open probe condition of the second temperature probe;

(C) shorted probe monitoring circuitry for producing a signal in response to a shorted probe condition of the second temperature probe;

(D) control transfer switching means placing control of the heat control switching means in the primary thermostat when the second temperature probe is not open and not shorted and automatically switching control of the heat control switching means to the fryer thermostat if the second temperature probe becomes open or shorted;

(E) temperature select means for producing a signal corresponding to a selected desired temperature of the cooking oil; and (F) temperature control circuitry for comparing the signal of the second temperature probe corresponding to the actual temperature of the cooking oil with the signal produced by the temperature select means corresponding to the desired temperature of the cooking oil, the temperature control circuitry producing a signal operating the heat control switching means when the actual temperature of the cooking oil is below the desired temperature of the cooking oil and control of the heat control switching means is in the primary thermostat.

* * * * *